United States Patent [19]
Watkins

[11] Patent Number: 5,918,414
[45] Date of Patent: Jul. 6, 1999

[54] METAMORPHIC DAMPING-OFF GUARD

[76] Inventor: Marvin L. Watkins, 16960 Cypress Way, Los Gatos, Calif. 95032

[21] Appl. No.: 08/889,056

[22] Filed: Jul. 7, 1997

[51] Int. Cl.[6] .............................. A01G 9/10; A01G 9/08
[52] U.S. Cl. .................................... 47/73; 47/74; 47/77
[58] Field of Search .................. 47/80, 81, 82, 47/41.1, 65.5, 65.6, 66.6, 73, 74, 64, 59, 63, 77; 71/64.07, 64.13, 903; 106/272

[56] References Cited

U.S. PATENT DOCUMENTS

| | | | |
|---|---|---|---|
| 1,988,307 | 1/1935 | Fay | 47/80 X |
| 1,996,898 | 4/1935 | Brandell | 47/65.6 |
| 2,026,679 | 1/1936 | Higgins | 47/65.6 |
| 2,143,468 | 1/1939 | Avery | 47/58 |
| 3,328,913 | 7/1967 | Vogt | 47/73 |
| 3,534,498 | 10/1970 | Herrli | 47/81 |
| 3,935,672 | 2/1976 | Chatelain | 47/65.6 X |
| 3,987,584 | 10/1976 | Yellin | 47/65.6 X |
| 4,051,625 | 10/1977 | Sawyer | 47/14 |
| 4,925,493 | 5/1990 | Lamoreaux | 106/272 |
| 5,040,330 | 8/1991 | Belgiorno | 47/65.6 X |
| 5,181,951 | 1/1993 | Cosse | 47/81 X |
| 5,459,960 | 10/1995 | Manlove | 47/65.5 |

*Primary Examiner*—Michael J. Carone
*Assistant Examiner*—James Bergin

[57] ABSTRACT

A Metamorphic Damping-off Guard (30) accessory for improving the performance of an excess water shedding root shaping plant container (100) is disclosed. Guard (30) is placed on top of the container's protrusion (120). This arrangement reduces soil moisture under a seedling's (70) stem and thereby protects it from damping-off disease. Guard (30) can be used in combination with an insertable protrusion (20) to provide similar protection for a seedling planted in a conventional plant container (10). The Metamorphic Damping-off Guard (30) is made from a durable component and a biodegradable component. The durable component is comprised of a quantity of small, rigid, durable, nonabsorbent, non-biodegradable, non-toxic objects, such as stones (35). The biodegradable component is comprised of a biodegradable, nonabsorbent, non-toxic cement, such as wax (37). The cement binds the objects together into an easily handled whole. The Metamorphic Damping-off Guard (30) changes its properties over time. This metamorphosis coincides with a plant's growth and its consequent decrease in susceptibility to damping-off. Initially a guard's form is as a moisture and root impervious whole which provides little space for roots but considerable protection against damping-off. Over time, a guard decomposes to become a loose, porous aggregate that provides considerable space for roots but reduced protection against damping-off.

17 Claims, 7 Drawing Sheets

METAMORPHIC DAMPING-OFF GUARD

CROSS-REFERENCE TO RELATED APPLICATIONS

The present invention preferably is used in combination with an Excess Water Shedding Root Shaping Plant Container, as described in my application, Ser. No. 08/627955, filed Apr. 3 1996.

FIELD OF THE INVENTION

The present invention relates generally to plant husbandry, and more particularly, to container devices which hold soil for the purpose of growing plants.

BACKGROUND

Plants that are grown for commercial sale, such as small trees and shrubs, are commonly grown in soil, or soil substitutes, held in containers. Compared with plants grown in the ground, container grown plants can be grown to marketable size quicker, they are more easily tended, they are more easily prepared and transported to market, and they can be successfully transplanted more often.

Water movement and retention characteristics of soil held in containers make maintaining a proper moisture level difficult. It is well known that the soil held by a plant container may store less water than a plant being grown in it may need. Less well understood is that soil held by a plant container can easily store more water than is healthy for a plant. For example, excess moisture in soil hosting a plant facilitates the growth of pathogenic soil organisms which attack a plant. Seedlings and young plants under such attack are said to be suffering from damping-off disease.

Damping-off is a disease condition of seedlings and cuttings. It is caused by certain parasitic fungi that invade a plant's tissues near the ground. Attack produces withering, usually associated with rotting of the stem near ground level. In general, damping-off is caused by soil-borne fungi that require moisture to survive. Such fungi thrive on excess soil moisture (i.e. damp soil) often occurring in conventional plant containers. Damping-off typically injures, and frequently kills, those plants it infests.

DESCRIPTION OF THE PRIOR ART

There appears to be little prior art directed mainly at either reducing soil moisture or restraining pathogenic soil fungi from infesting soil held in a plant container. Watkins, U.S. Pat. No. 5,787,641 August 1998, describes in detail how an appropriately shaped protrusion situated on the floor of a plant container's soil receiving space reduces the moisture content of soil held by the container. However, this invention does not adapt itself to a growing plant's expanding root system.

Avery, U.S. Pat. No. 2,143,468 September 1936, discloses a plant growing medium comprised of a molded block of sand bound together with partially glutinized leather fibers. Avery asserts that his invention absorbs much more water and diffuses it to a plant's roots better than does loose sand. He notes that because a block's manufacture leaves it initially sterile, it minimizes the potential for damping-off disease. However, such protection is no different than that provided by using any sterilized planting medium. So, at best it's damping-off protection is very short-lived because water and roots invade the block growing medium immediately.

Lamoreaux, U.S. Pat. No. 4,925,493 May 1990, discloses an animal trap camouflage comprised of a loose, soil mixture which has been impregnated with wax. Lamoreaux asserts that his invention prevents an animal trap from becoming inoperative during wet winter conditions because it's water repellant nature prevents it from freezing into a stiff mass. Wax impregnated soil would appear to be a poor, but expensive, plant growing medium which provided minimal transient damping-off protection.

The following inventions are not directed at restraining damping-off disease or reducing excess soil moisture. They are considered here because they exhibit central structures protruding upwards from their container's floor. Such structure may reduce some forms of excess soil moisture.

Edwards, British Patent No. 8352 April 1894, discloses a plant container having an inverted pot shaped floor almost filling the plant container's soil receiving space. This device is meant to facilitate growing orchids by eliminating virtually all soil from the container. When inverted, it becomes a wholly conventional plant container. It's design is so specialized for epiphytes that it is impractical for general horticulture use.

Howe, British Patent No. 1,586,781 January 1977, discloses a plant container having a small hemisphere with base apertures formed in the container's floor. This device is meant to capture condensation moisture and deliver it to the soil.

Gross, U.S. Pat. No. Des. 243,112 January 1977, discloses a plant container having a pentagonal platform formed in the container's floor. The purpose of this device is not clear from the patent disclosure.

Vogt, U.S. Pat. No. 3,328,913 July 1967, discloses a complex plant container apparatus having a hollow transparent insert projecting through the container's floor. This device is meant to allow viewing a plant's roots.

Hawthorne, U.S. Pat. No. 5,327,679 July 1994, discloses a plant container having hollow legs formed between transverse ridges molded into the container floor. This device is meant to train growing roots into divergent clumps.

Manlove, U.S. Pat. No. 5,459,960 October 1995, discloses a plant container having a small central cylinder with a receiving cup and aperture in its top. This device is meant to capture and air prune a plant's tap root.

Thus, their efficacy with respect to these particular objectives is deficient. Except for Watkins and Edwards, none of the above inventions eliminates moisture from immediately beneath a seedling's stem. Except for Avery none of the above inventions adapts itself to accommodate a growing plant's expanding root system. Exept for Avery and possibly Lamoreax, none of the above inventions enables slowly administering a fungicide additive to the soil surrounding a plant's roots. None of the above inventions includes a flexible mechanism that allows a grower to adjust a given container's performance or capacity to account for special circumstances.

ADDITIONAL COMMENTS ABOUT PRIOR ART

In practice, simple receptacles having drainage holes have been used with an iterative transplanting process to make container grown plant culture quite successful. This process, however, demands continual balancing of opposed needs.
Container Volume A conventional plant container provides only drainage holes to eliminate excess water. Drainage holes alone are ineffective at reducing excess soil moisture in relatively large conventional containers. (i.e. Container volumes are relative to the current volume of a plant's roots.) So, relatively large conventional containers hold considerable excess moisture. Excess moisture promotes damping-off fungi, so, relatively large conventional containers increase the likelihood that damping-off will occur. Plant growers are thus motivated to use relatively small plant containers.

Plants grown in relatively small containers for too long a time become root-bound. Root-bound plants experience stunted growth. They are difficult to maintain and they are difficult to transplant successfully. Further, relatively smaller containers eliminate soil that would otherwise act as a moisture reservoir. Without this reservoir, a plant must be watered more frequently and it is significantly more likely to experience drought caused injury. Drought injuries weaken a plant and retard it's subsequent growth. So, relatively small containers increase the likelihood that a plant will become root-bound and/or suffer drought. Plant growers are thus motivated to use relatively large containers and/or to transplant more frequently.

Transplanting Frequency

Transplanting is labor intensive and often involves injury to a plant's roots. So, frequent transplanting increases costs and the likelihood that injury will occur. Root injuries weaken a plant, provide easy access for pathogens, and retard it's subsequent growth. Plant growers are thus motivated to transplant as infrequently as possible.

Infrequent transplanting increases the likelihood that root-binding will occur. As stated above, root-bound plants experience stunted growth, are difficult to maintain and to transplant. Plant growers are thus motivated to use relatively large containers and/or to transplant more frequently.

Growing Practice

Commercial growers in fact generally place a plant into a well-drained container with a soil volume only slightly larger than the plant's existing root volume. A regimen of watering and fertilizing is instituted that both encourages growth and seeks to maintain an average moisture level between drought and drowning. After the plant's roots have grown sufficiently to fill the soil volume—but before it becomes root-bound—it is removed from its container and replanted into a larger one. This cycle is repeated until the plant reaches marketable size.

OBJECTS AND ADVANTAGES

My metamorphic damping-off guard invention is directed mainly at preventing damping-off disease in seedlings and young plants. It does so primarily, but not exclusively, by extending and improving the properties of an excess water shedding root shaping plant container, as described in Watkins, U.S. Pat. No. 5,787,641.

Accordingly, several objects and advantages of the present invention are to provide an excess moisture reducing accessory for a plant container that:

1. Reduces excess soil moisture immediately beneath a seedling's stem;
2. Adapts to a plant's growing root system;
3. Enables delivering fungicides and micronutrients to the soil surrounding a seedling's roots;
4. Enables adjusting the degree of moisture reduction; and
5. Enables adjusting the container's soil capacity for special circumstances.

Further objects and advantages are to provide an accessory which allows using a plant container that holds a substantially larger volume of soil relative to a contained plant's root volume than can a conventional plant container and which simultaneously reduces the likelihood of damping-off disease. Therefore, a seedling can be grown to marketable size without becoming root-bound and without the need for multiple transplantings. By eliminating the need for iterative transplanting, increasing the convenience and simplifying the tasks involved with growing seedlings in containers, the present invention lowers the costs for commercial nurseries to grow seedlings to marketable size.

Still further objects and advantages will become apparent from a consideration of the ensuing description and drawings.

SUMMARY

A metamorphic darnping-off guard placed beneath a seedling:

1. Eliminates soil moisture beneath the seedling's stem and a short distance radially outward therefrom.
2. Decomposes over time to become a loose, porous aggregate.

Excluding soil moisture from the region axially under a seedling's stem protects it from moisture thriving pathogenic soil organisms, including damping-off causing fungi. Decomposing over time to become a loose, porous aggregate accommodates a growing root system's need for additional space.

A metamorphic damping-off guard is generally placed on the apex of a protrusion. There are two cases. One, an excess water shedding root shaping plant container is used. Two, an insertable protrusion is used in combination with a conventional plant container.

In either case, a protrusion:

1. supports and positions a metamorphic damping-off guard;
2. causes the soil receiving space to be restricted to the periphery in the lower portion of the container; and
3. causes this peripheral ring-like lower portion of the soil receiving space to taper downwardly to an approximately V-shaped lower boundary.

The centrally excluded downwardly tapering soil receiving space so formed causes soil held within the container to shed more excess water than does soil held within a similar container but having an unconstricted soil receiving space.

LIST OF DRAWINGS

| FIG. | Description of Drawing |
|---|---|
| 1 | A top perspective view of a metamorphic damping-off guard. |
| 2 | A top perspective view in partial section of a metamorphic damp-ing-off guard in situ. |
| 3a,3B,3C | Time-lapse vertical section views of a young plant growing above a biodegrading metamorphic damping-off guard. |
| 4 | A top perspective view in partial section of an excees water shedding insertable protrusion placed in a conventional plant container. |
| 4a | A detail view of the breakaway flutes indicated by section lines A—A in FIG. 4 |
| 5 | A top perspective view in partial section of a metamorphic protrusion place in a conventional plant container. |
| 5A | An upwardly directed perspective view of the base of a metamorphic protrusion showing its radial drain grooves. |

-continued

List of Drawings

| FIG. | Description of Drawing |
|---|---|
| 6 | damping-off guards placed in an excess water shedding root shaping plant container. |
| 7 | A vertical section view of a hemispheric shaped metamorphic damping-off guard placed above a conically shaped insertable protrusion. |

List of Reference Numerals

| Reference Numeral | Name of Feature or Part |
|---|---|
| 10 | Conventional Plant Container |
| 11 | CPC top |
| 12 | CPC side wall |
| 13 | CPC floor |
| 14 | CPC side wall drain aperture |
| 15 | CPC floor drain aperture |
| 20 | Insertable Protrusion |
| 21 | IP apex |
| 22 | IP side wall |
| 23 | IP base |
| 24 | IP breakaway drain notch |
| 25 | IP base opening |
| 26 | IP hollow interior |
| 27 | IP breakaway rim |
| 28 | IP drain notch breakaway flute |
| 29 | IP rim breakaway flute |
| 30 | Metamorphic Damping-off Guard |
| 31 | MDoG apex |
| 32 | MDoG side surface |
| 33 | MDoG base |
| 35 | MDoG stone |
| 37 | MDoG wax |
| 40 | Metamorphic Protrusion |
| 41 | MP apex |
| 42 | MP side surface |
| 43 | MP base |
| 44 | MP radial drain grooves |
| 50 | Trough |
| 60 | Second Metamorphic Damping-off Guard |
| 70 | Seedling |
| 72 | Seedling roots |
| 80 | Soil |
| 82 | Soil surface |
| 100 | Excess Water Shedding Root Shaping Plant Container |
| 120 | XWSRSPC Protrusion |
| 121 | XWSRSPC Protrusion apex |

METAMORPHIC DAMPING-OFF GUARD DETAILED SPECIFICATION

Figure 1:
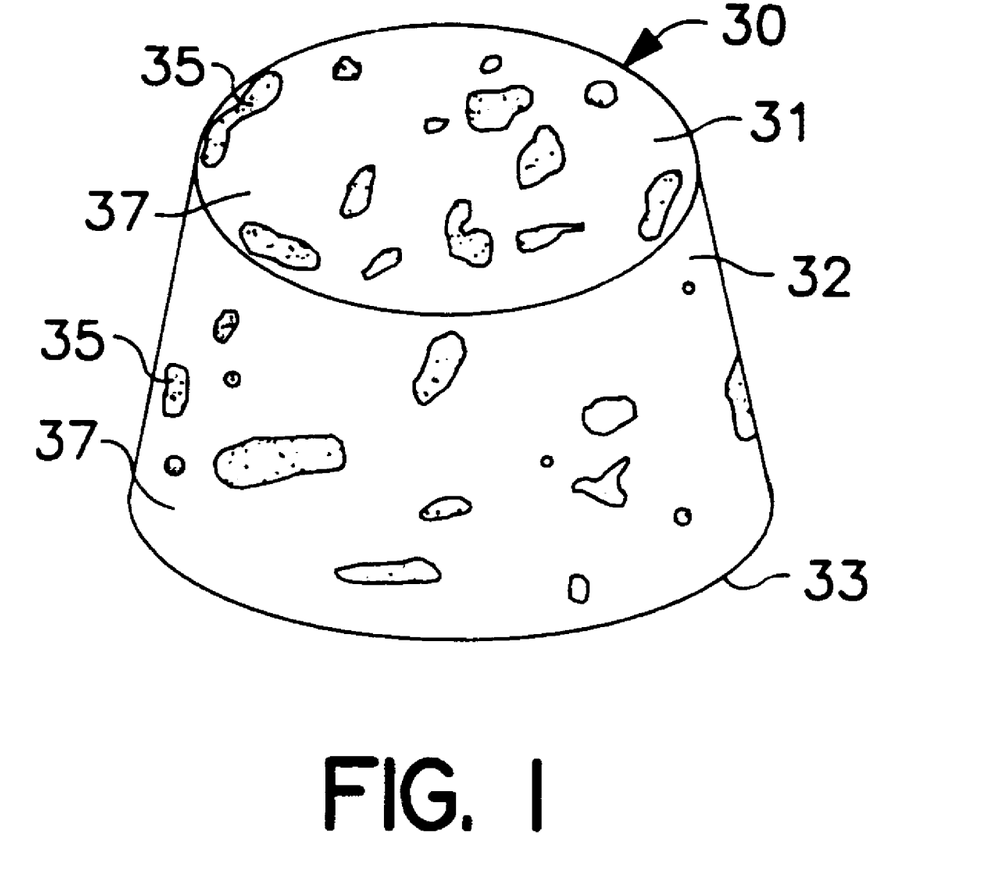

FIG. 1—Structure

Figures 3A, 3B:
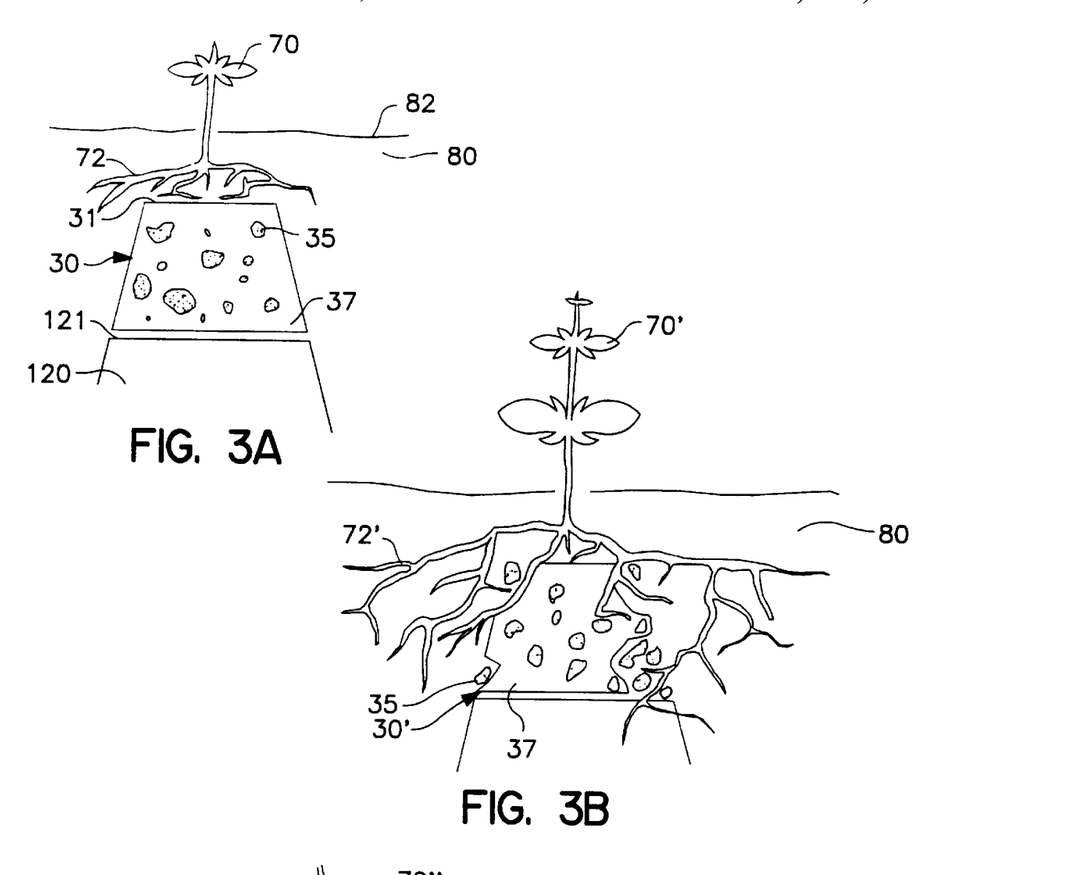
Figure 3C:
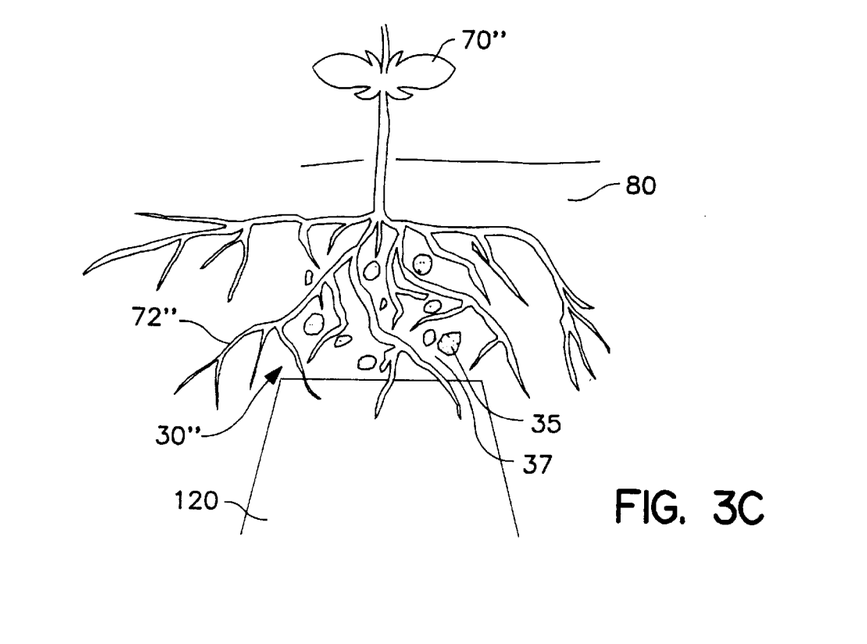

A preferred embodiment for the metamorphic damping-off guard of the present invention is illustrated in FIG. 1. FIG. 1 is a top perspective view of a metamorphic damping-off guard. Metamorphic damping-off guard 30 is made from a durable component and a biodegradable component. The guard 30 is shaped like the frustum of a cone. Notice that FIG. 1 shows the initial condition of guard 30. This point is important to note because a guard's properties change with time as shown in FIGS. 3A, 3B and 3C and discussed in the Operations section below.

Durable Component

The durable component of guard 30 is comprised of a plurality of small stones 35. Stones 35 have many properties that make them desirable for a guard. Individually, stones are rigid, durable, nonabsorbent, non-biodegradable, and not harmful or toxic to plant roots. Collectively, when stones are poured into a small receptacle or mold, their arbitrary shapes guarantee that significant space remains between them.

Abstracting from these specifics, the durable component comprising a guard should have the following properties.

1. A guard's durable component is made up of individually small, durable objects which are substantially impervious to moisture and root penetration.
2. A typical object's imperviousness must endure for a substantial time.
3. The objects collectively must be porous when packed together.
4. Their porosity must endure for a substantial time.
5. The objects, both individually and collectively, must be substantially harmless to plant roots.

Biodegradable Component

The biodegradable component is comprised of wax 37. Wax 37 has many properties that make it desirable for a guard. Wax is biodegradable, nonabsorbent, and not harmful or toxic to plant roots. Wax has a liquid phase in which it can flow through a porous space. After cooling, wax's solid or normal phase can bind or cement small objects together into an easily handled whole.

Abstracting from these specifics, the biodegradable component comprising a guard should have the following properties.

1. A guard's biodegradable component must have a liquid or plastic phase during which it can be introduced into the space between porous objects.
2. It must have a solid or normal phase during which:
    it cements durable, collectively porous objects into a whole;
    it is substantially impervious to moisture and/or to root penetration; yet
    it can be consumed or decomposed by normal biological activity.
3. The normal phase must be substantially harmless to plant roots.

Shape

Guard 30 is shaped like the frustum of a cone. Its side surface 32 slopes upwardly and inwardly from base 33 to apex 31. Both apex 31 and base 33 are substantially planar, but the nature of the invention allows considerable deviation from true parallel planes.

Abstracting from a frustum shape, the shape of a guard should have the following properties.

1. A guard's shape must exclude soil and moisture from beneath a seedling's stem and for a distance radially out from the stem's axis.
2. It's side(s) should facilitate the movement of water away from the seedling's stem and towards its container's periphery.
3. It's base should be able to rest stably on the apex of a protrusion during planting.

Particular Embodiment Guard 30's durable component is comprised of a plurality of small, smooth, stones 35. Stones 35 are quartz of mostly gravel grade size with some small pebble grade size ones occurring as well. They range from about 2 mm to about 16 mm across in their longest dimension with a median of about 8 mm.

Guard 30's biodegradable component is comprised of wax 37. Wax 37 substantially fills the space between stones 35 and thereby binds or cements them together. Another way of saying this is that stones 35 are embedded in wax 37. Wax 37 is an FDA approved paraffin canning wax that melts at about 120° F.

Guard 30's shape is that of the frustum of a cone. Guard 30 has height, apex diameter and base diameter dimensions of 2.5 cm×4.1 cm×6.0 cm, respectively.

Fabrication

The materials used in the particular embodiment of FIG. 1 are small, smooth, quartz stones 35 and paraffin wax 37. A simple procedure to make several guards of this type using a household muffin pan as a mold consists of:

1. Fill each receptacle of the mold (i.e. muffin pan) to the desired height with stones.
2. Heat the mold and stones to 175° F., a temperature which is somewhat above the melting point of paraffin.
3. Heat the wax to a temperature of 175° F. until it is completely melted.
4. Pour sufficient melted wax over the stones and into the mold's receptacles to fill each receptacle to a level slightly above the stones' upper surface.
5. Allow the mold and materials to cool.
6. Remove the (newly made) guards from the mold.

Alternate Embodiments

Alternate embodiments of a metamorphic damping-off guard can be made using other objects than stones for the durable component, provided they exhibit properties similar to those listed above. Small beads or pellets made from such materials as: metal, glass, fired clay or other ceramic, polypropylene, polystyrene foam or other plastic material could be used. Notice that because time is relative to that required to grow a seedling into a mature plant, even wooden beads could be used. This is so because solid wooden beads would endure for several years when buried beneath a plant's stem. Furthermore, their durability could be greatly increased using various treatments. For example, coating with a protective surface finish or pressure treating with a preservative such as copper naphthenate.

However, each of these alternate materials has other properties that make them less suitable than stones to serve as a guard's durable component. For example, as metal rusted it would tend to make the surrounding soil more acid. This would be undesirable for many plants. Glass and ceramic beads might fracture. This would leave dangerously sharp edges where roots—and often fingers—go. Some gardeners dislike plastic materials in general and others find the presence of polystyrene foam in soil mixtures quite annoying. Wood's durability is near the lower limit of usefulness for a guard.

Alternate embodiments of a metamorphic damping-off guard can be made using other substances than wax for the biodegradable component, provided they exhibit properties similar to those listed above. Many glues and adhesives have such properties. Some fillers and putties would work, as would some coatings and sealants.

The suitability of such alternate materials has not yet been fully explored. However, one possible alternate embodiment would constitute the biodegradable component very non-uniformly so that different regions exhibit varying degrees of hardness and permanence. In this case, the durable component would be replaced by the slowly decomposing regions of the biodegradable component.

Alternate embodiments of a metamorphic damping-off guard can be made using other shapes. A guard could be conical, cylindrical, hemispherical or some combination of shapes. A frustum shaped guard could be placed larger base up to provide a slightly more arid region for a seedling without changing its decomposing time.

Figure 5:
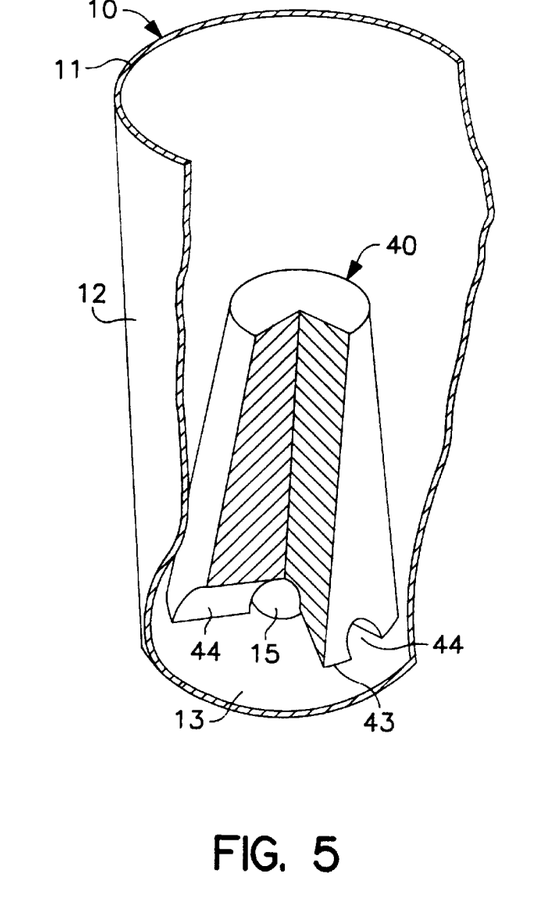
Figure 6:
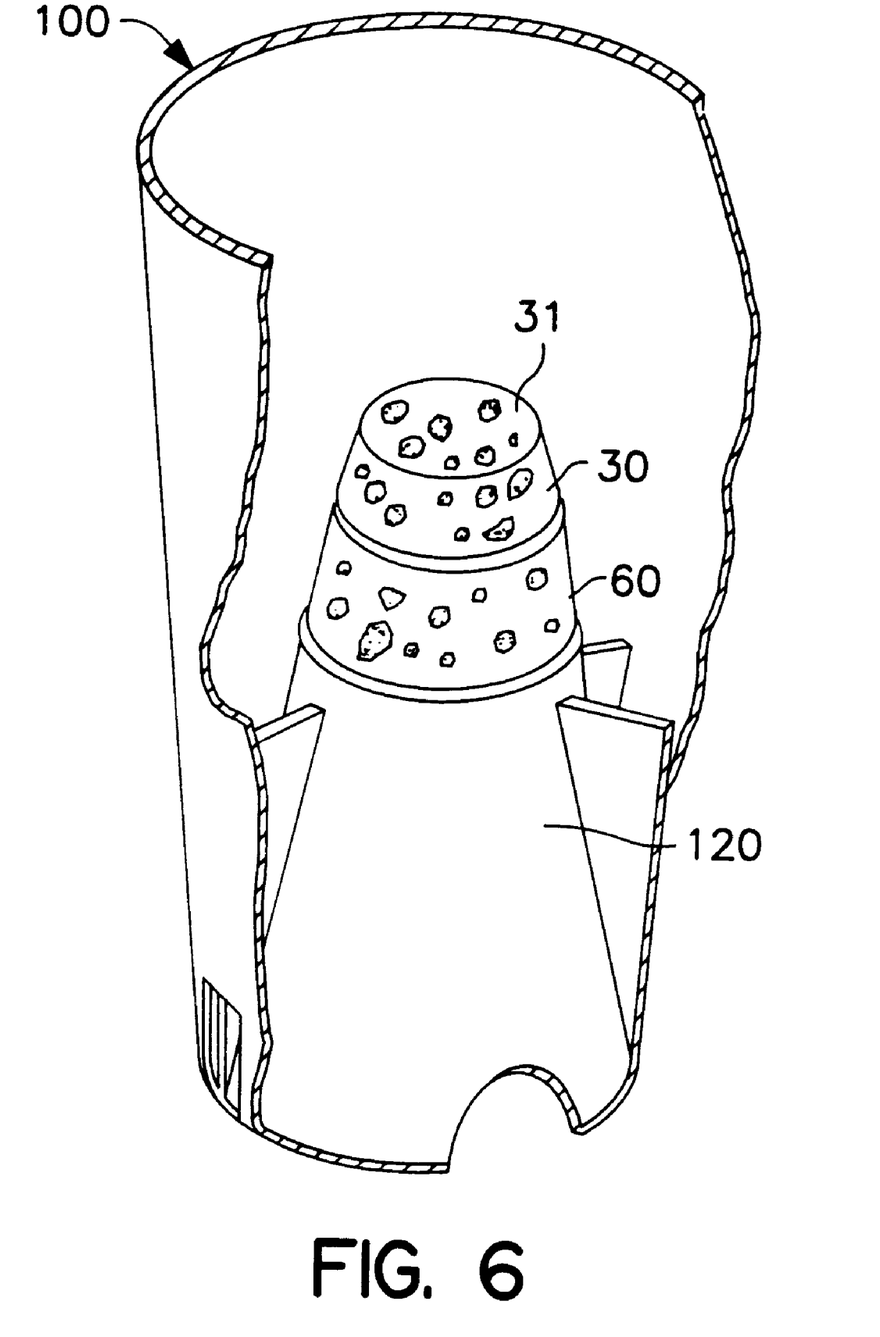

Guards can be manufactured so that they have different decomposing rates. This can be achieved by using different substances, by using different grades of the same substance, and/or by using special agents with a given grade of a single substance. FIGS. 5 and 6 show embodiments wherein having varying decomposing rates would enhance the benefit provided by a metamorphic damping-off guard.

Guards can be manufactured having different additives. Typically, an additive would be added to the biodegradable component. However, an additive could be added to the durable component either by applying a coating to the objects or by impregnating them with the additive.

Typically, an additive would be a fungicide. For example, a fungicide could be added to the wax to provide active control of damping-off fungi. In this case, fungicide would be slowly released as a guard decomposed. This would provide enhanced protection, for a prolonged period of time, and without grower intervention. On the other hand, nutrients might be added as well. Adding micronutrients would provide a continuous, non-leaching supply of rare but important minerals, vitamins, hormones, &etc. to a plant.

Figure 2:
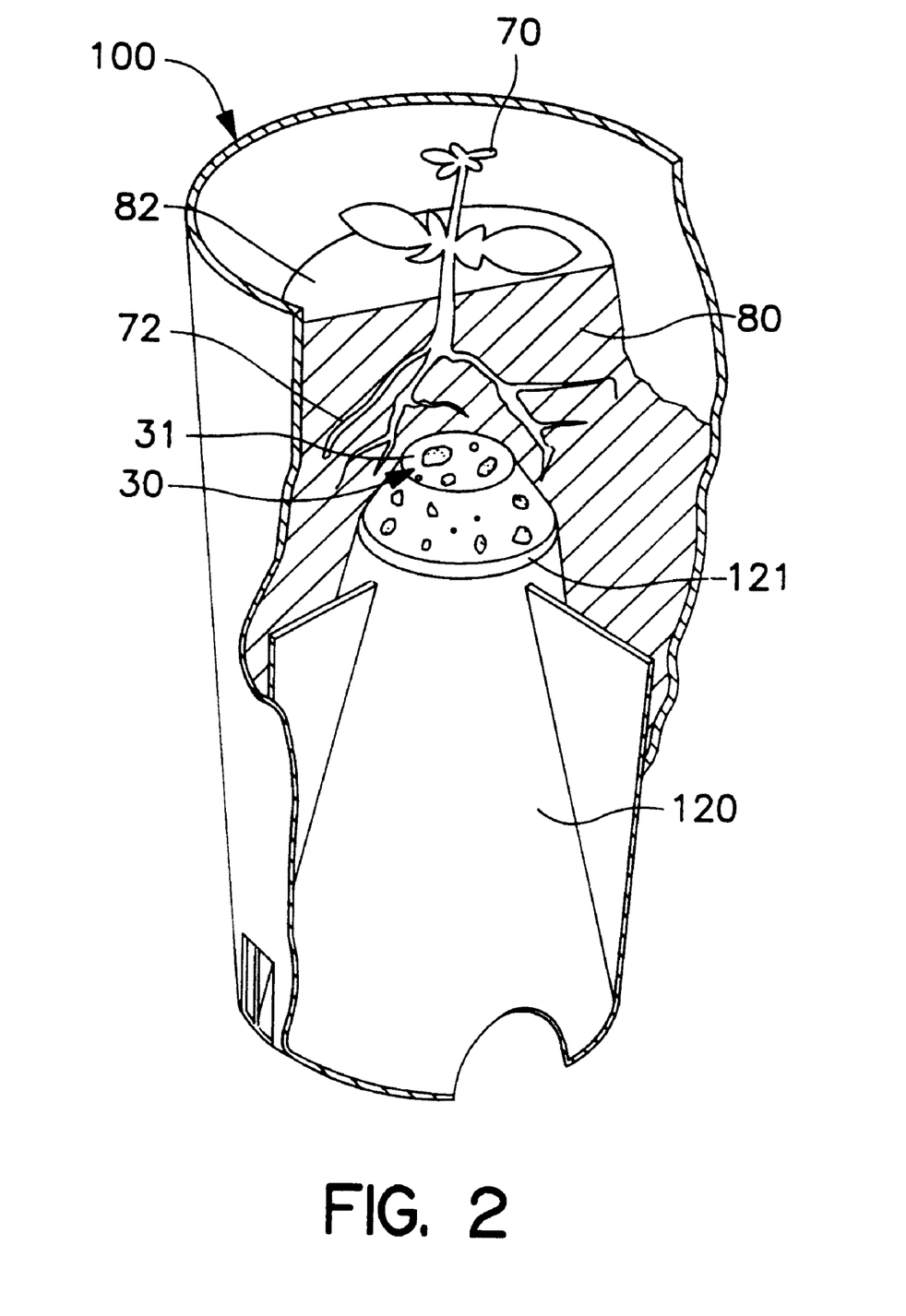

FIG. 2—Arrangement

A preferred arrangement of the metamorphic damping-off guard of the present invention is illustrated in FIG. 2. FIG. 2 is a top perspective view in partial section of a metamorphic damping-off guard in situ. Again, notice that FIG. 2 shows the initial condition of guard 30.

Guard 30 is placed on apex 121 of protrusion 120 of excess water shedding root shaping plant container 100. This arrangement continues protrusion 120 upwardly. Seedling 70 is planted above apex 31 of guard 30. Seedling 70 is growing in soil 80 held within container 100. Soil 80 surrounds and envelops seedling 70's roots 72, guard 30, and protrusion 120. The upper surface of soil 80 is shown at 82.

Protrusion 120 imposes on container 100's soil receiving space a shape which causes soil held in container 100 to shed more excess water than does soil held in a similar conventional plant container. A reduction in soil moisture helps protect seedling 70 against moisture loving pathogenic soil organisms. Additional explanation for this property of properly shaped protrusions is given in the discussion for FIG. 4.

Guard's 30 placement on protrusion apex 121 continues protrusion 120's moisture reducing function further upward into soil 80 held by container 100. This arrangement therefore provides greater protection against moisture loving pathogenic soil organisms than would be provided by excess water shedding root shaping plant container 100 alone.

Alternate Embodiments

Other features of a metamorphic damping-off guard are suggested by FIG. 2. Protrusion 120 provides a platform of predetermined height upon which to place guard 30. By increasing the combined height of protrusion 120 and guard 30, the soil depth under seedling 70's stem can be decreased, and conversely. By increasing the diameter of guard 30 the extent of the arid region under a seedling's stem can be increased, and conversely. Together, these enable adjusting the protective performance (i.e. the degree of damping-off protection) and soil capacity supporting a seedling.

FIGS. 4, 5, 6, and 7 show typical alternate embodiments for the present invention. Still others are, of course, possible.

FIGS. 3A, 3B and 3C—Operation

The operation of a metamorphic damping-off guard is illustrated in FIGS. 3A, 3B and 3C. FIGS. 3A, 3B and 3C are time-lapse vertical section views of a young plant growing above a biodegrading metamorphic damping-off guard. They show a seedling growing into a young plant while its metamorphic damping-off guard metamorphoses into a loose aggregate of stones.

A guard is said to metamorphose because its properties change over time. A guard's properties change in keeping with both a plant's growth and its susceptibility to attack by damping-off fungi. This is so because a guard has a biodegradable component and in use it is placed in a biologically active environment (i.e. soil).

A plant is most at risk to damping-off as a seedling. As a plant matures, its susceptibility to damping-off and moisture loving pathogenic soil organisms significantly decreases. Initially, a guard is an impervious whole which excludes all moisture. It thereby provides considerable protection against damping-off. As a guard biodegrades over time, it becomes a loose, porous aggregate. In so far as moisture can penetrate into this aggregate, it provides reduced protection against damping-off.

A plant's root system is minuscule as a seedling. As a plant matures, its root system can become immense. Initially, a guard is impervious and therefore provides no space for roots. As a guard metamorphoses into a loose, porous aggregate, it provides incrementally more space for roots.

FIG. 3A

FIG. 3A shows an intact metamorphic damping-off guard 30 that is resting on apex 121 of protrusion 120.

Stones 35 are impervious to moisture and/or root 72 penetration. Wax 37 is a nonabsorbent, biodegradable plastic substance. Because wax 37 substantially fills the space between stones 35, the whole (i.e. guard 30) is impervious to water penetration. Roots, in general, will not grow into a dry solid. So, guard 30 is impervious to root penetration as well.

Thus, FIG. 3A shows a newly planted seedling 70 with roots 72 that grow through soil 80 between soil surface 82 and guard apex 31.

FIG. 3B

FIG. 3B shows a partially decomposed metamorphic damping-off guard 30'.

As wax 37 decomposes due to biological activity, it vacates space between stones 35 and thereby increasingly admits root penetration into the interior of partially decomposed guard 30'. Space is vacated by wax 37 first at the surface of partially decomposed guard 30'. Only later is space in its interior vacated. So, plant roots 72' will penetrate the periphery of partially decomposed guard 30' first, and only later penetrate into its interior. This sequence is assured by the fabrication process.

The fabrication process for the preferred embodiment yields a metamorphic damping-off guard that is substantially impervious to moisture and root penetration. The fabrication process heats stones and wax to a temperature of about 175° F. Sustained temperatures of this magnitude kill common forms of bacteria. Thus, the fabrication process for the preferred embodiment assures that a metamorphic damping-off guard is sterile at fabrication, and so has no biodegrading bacteria in its interior. Because soil is not sterile, or rapidly becomes non-sterile, biodegrading processes must begin at a guard's exterior surface and thence proceed inwardly.

Thus, FIG. 3B shows very young plant 70' as having roots 72' that have begun to grow into the periphery of partially decomposed guard 30'.

FIG. 3C

FIG. 3C shows a completely decomposed metamorphic damping-off guard 30". Eventually wax 37 decomposes entirely leaving a residue comprised of an aggregate of loosely packed stones 35. While stones 35 remain impervious to root and moisture penetration, roots 72" can penetrate into the space between them that is vacated by wax's decomposition.

Thus, FIG. 3C shows young plant 70" as having roots 72" that have grown through completely decomposed guard 30"'s periphery and into its interior.

Notice that even though completely decomposed guard 30" has completely metamorphosed, the aggregate residue of stones 35 continues to provide protection against moisture loving pathogenic soil organisms. This is so because the aggregate will be very porous. High porosity implies low moisture retention. Furthermore, the aggregate residue's 30" position above protrusion 120, assures that excess moisture will move away from the vicinity of plant's 70" stem.

INSERTABLE PROTRUSION DETAILED SPECIFICATION

Figure 4:
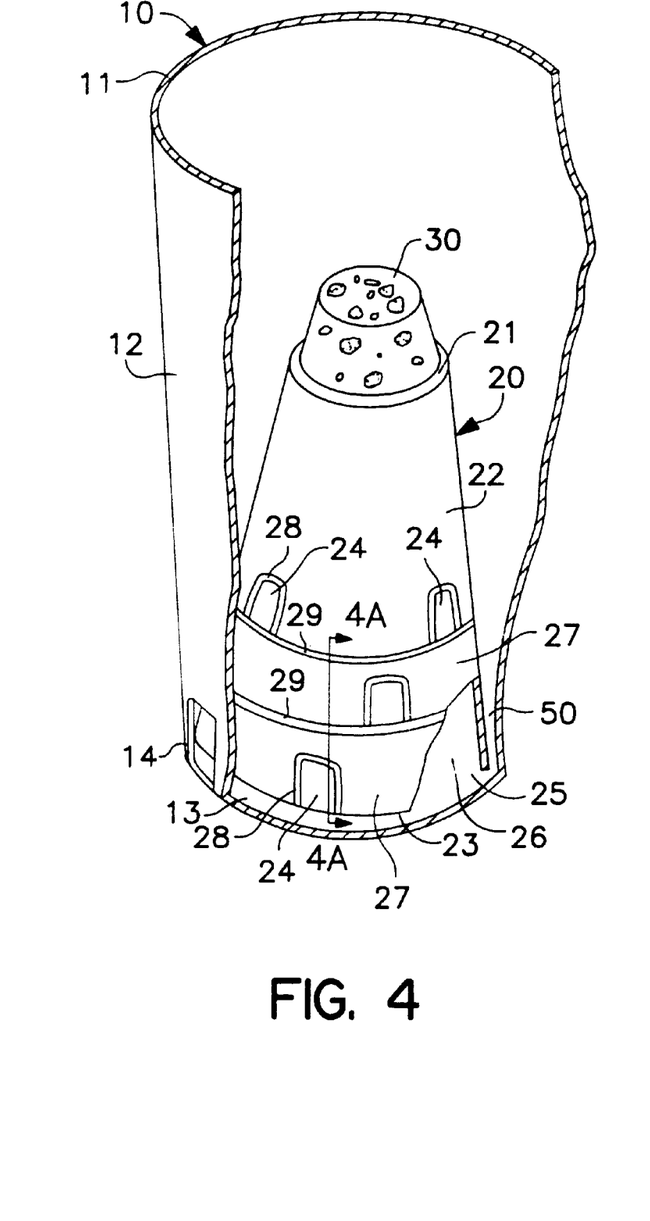

FIG. 4—Structure & Operation

An embodiment for the insertable protrusion of the present invention is illustrated in FIG. 4. FIG. 4 is a top perspective view in partial section of an excess water shedding insertable protrusion placed in a conventional plant container. A metamorphic damping-off guard placed above the insertable protrusion adapts its protective capabilities for seedlings.

Conventional Plant Container

FIG. 4 shows insertable protrusion 20 is placed on soil receiving space floor 13 of conventional plant container 10.

Conventional plant container 10 has the shape of a frustum of a cone: a planar circular closed base or floor 13, a planar circular open apex or top 11, and a continuous side wall 12. Container floor 13's diameter is smaller than top 11's diameter, so that side wall 12 slopes upwardly and outwardly from floor 13 to top 11. Container 10 has symmetrically arranged drain apertures 14 which penetrate side wall 12 adjacent to floor 13.

Metamorphic Damping-off Guard

FIG. 4 shows that metamorphic damping-off guard 30 is placed on insertable protrusion 20's apex 21. Guard 30's properties are described in the discussions for FIGS. 1 and 3.

Insertable Protrusion

FIG. 4 shows insertable protrusion 20 has the shape of a frustum of a cone. Insertable Protrusion 20 has a planar circular open base 23, a planar circular closed apex 21, and a continuous side wall 22. Protrusion base 23 diameter is larger than apex 21 diameter, so that side wall 22 slopes upwardly and inwardly from base 23 to apex 21. Protrusion 20 is hollow 26 so that base opening 25 opens into protrusion hollow 26.

Insertable Protrusion 20 is placed centrally on container 10's floor 13. Protrusion base 23's diameter is slightly smaller than container floor 13's diameter. The height of protrusion apex 21 above container floor 13 is chosen so that the combined height of protrusion 20 plus guard 30 leaves a predetermined planting depth for a seedling. Thus, protrusion 20 provides a platform of predetermined height upon which to place guard 30.

Insertable Protrusion 20 has a series of circumferential breakaway rims 27. Breakaway rims 27 are defined by thin grooves or flutes 29 encircling protrusion 20 parallel to its base 23. Rim breakaway flutes 29 weaken the rim of side wall 22 below flute 29. This enables a breakaway rim to be removed by fracturing protrusion side wall 22 along rim breakaway flute 29. Removing a breakaway rim both reduces the height of protrusion 20 and reduces the diameter of protrusion base 23. Thus, breakaway rims 27 provide a way to adjust protrusion 20's height and/or width to fit different size containers. Breakaway rims 27 can also be used to reduce protrusion 20's height to allow planting a seedling at a greater depth.

Insertable Protrusion 20 has a series of breakaway drain notches 24. Each series consists of a plurality of breakaway drain notches 24 spaced symmetrically around the circumference of protrusion 20. The first series is adjacent to protrusion base 23. Each succeeding series is adjacent one of the rim breakaway flutes 29. Breakaway notches 24 are defined by thin grooves or flutes 28 formed like an upside down "U". The parallel flutes forming the legs of each breakaway drain notch 24 intersect the adjacent base 23 or rim breakaway flute 29. Drain notch flutes 28 weaken the area of side wall 22 that they enclose. This enables breakaway notches 24 to be optionally removed. Removing breakaway notches 24 creates drain notches through which excess water can flow from the soil receiving space into protrusion hollow 26, and thence through protrusion base opening 25 into a central drain aperture in a container (see FIGS. 5 and 7).

Further, each succeeding series of breakaway drain notches 24 is staggered with respect to the previous series. Staggering each series helps assure that breakaway drain notches 24 can be fractured and removed without also fracturing nearby breakaway drain notches 24 belonging to another series.

Figure 4A:
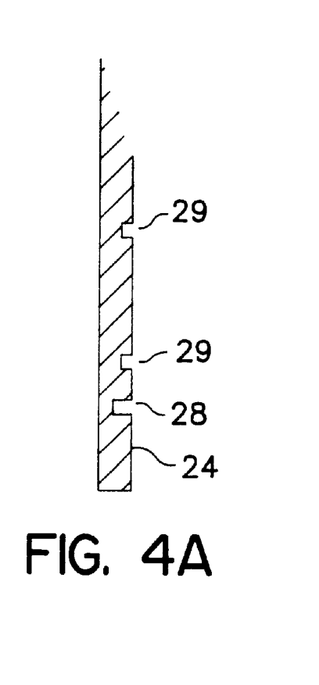

FIG. 4A—Breakaway Flute Details

FIG. 4A provides a detail view of the breakaway flutes indicated by section lines A—A in FIG. 4.

FIG. 4A shows that drain notch breakaway flutes 28 are deeper than rim breakaway flutes 29. This helps assure that breakaway drain notches 24 can be fractured along their flutes and removed without also fracturing nearby rim breakaway flutes 29. Breakaway drain notches 24 are spaced apart from non-adjacent rim breakaway flutes 29 to further strengthen them.

Excess Moisture Protection and Reservoir

The purposes of a protrusion are: one, to cause excess water to be shed from contained soil; and two, to provide a platform for a metamorphic damping-off guard.

Protrusion 20 and guard 30 define a soil excluding space within container 1 O's soil receiving space. Because they exclude soil, they exclude moisture from the space they occupy as well. Further, a protrusion imposes certain characteristics on the shape of a plant container's receiving space, namely: they form an approximately "V" or "U" shaped trough 50 which runs circumferentially around protrusion 20. Further, the assembled combination of container 10, protrusion 20, and guard 30 have an approximately "W" shaped vertical cross-section.

These shapes cause soil held in a container with a protrusion to shed more excess water than would soil held in a similar container without a protrusion being present. The moisture content of such soil is below that needed to sustain moisture loving pathogenic soil organisms. However, the moisture content is sufficient to provide a critical reservoir which seedling roots can readily and naturally tap. A full explanation is given in Watkins, U.S. Pat. No. 5,787,641.

Particular Embodiment

Conventional plant container 10 is a standard commercial one gallon pot made from opaque black polypropylene. Container 10 has height, apex diameter and base diameter dimensions of 17.2 cm×15.2 cm×13.0 cm, respectively. Side wall 12 and floor 13 of container 10 are 1.6 mm thick. There are four drain apertures 14 arranged symmetrically around container 10's circumference adjacent floor 13. Drain apertures 14 have height and width of 1.5 cm×2 cm, respectively.

Insertable protrusion 20 is molded from polyethylene. Protrusion 20 has height, apex diameter and base diameter dimensions of 6.7 cm×6.2 cm×11.4 cm, respectively. Side wall 22 and apex 21 of protrusion 20 are 0.8 mm thick.

Particular properties of metamorphic damping-off guard 30 are described in the discussion for FIG. 1.

Alternate Embodiments

FIG. 4 shows container 10 and protrusion 20 having particular shapes. However, any upwardly projecting device with the following two characteristics will cause soil to shed excess water: (a) soil is restricted to the periphery in the lower portion of a container; and (b) this peripheral ring-like lower portion of the receiving space tapers downwardly. Alternate shapes which could be used include cones, pyramids, hemispheres, &etc.

Similarly, a container with arbitrary horizontal cross section can be used. The shape of a protrusion base's periphery should be similar to the shape of its associated container's receiving space periphery to obtain maximum excess water shedding functionality. For an alternate embodiment using a square container, the preferred shape for a protrusion would be as the frustum of a pyramid.

Container 10 has side wall drain apertures 14. Notice that insertable protrusion 20 of FIG. 4 can be used with a conventional container having a central floor drain aperture such as that shown in FIG. 5. Alternatively, it could also be used with a container having multiple drain apertures penetrating its floor.

Other materials that could be used to make insertable protrusions include polystyrene foam, various fibrous materials, various compressed organic materials, &etc. Possible formable materials include ceramics, wood, metal, glass, &etc. FIG. 5 describes an insertable protrusion made from the same materials as a metamorphic damping-off guard.

ALTERNATE EMBODIMENTS

FIG. 5—Metamorphic Protrusion

FIG. 5 is a top perspective view in partial section of a metamorphic protrusion placed in a conventional plant container. In this embodiment, the guard 30 and insertable protrusion 20 of FIG. 4 are replaced by a single metamorphic protrusion 40. A metamorphic protrusion 40 is made in the same manner as metamorphic damping-off guard 30 of FIG. 1. However, it is typically larger.

Metamorphic protrusion 40 has a plurality of symmetrically spaced radial drain grooves 44 in base 43. Drain grooves 44 meet at the center axis of protrusion 40 immediately above container 10's central floor drain aperture 15. Drain grooves 44 allow use of metamorphic protrusion 40 with conventional containers having only a single central floor drain aperture 15. In this case, drain grooves 44 channel water from the container's soil receiving space to container 10's central drain aperture 15 where it escapes from container 10.

Figure 5A:
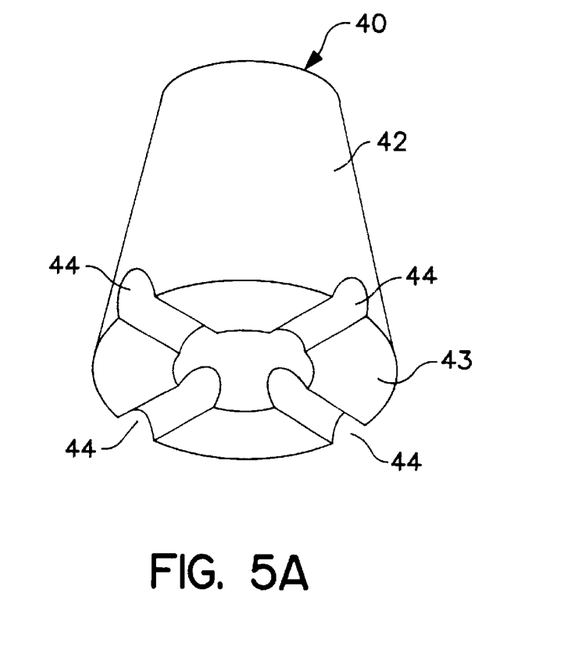

FIG. 5A provides a detail veiw showing the radial drain grooves 44 in the base of metamorphic protrusion 40.

Metamorphic protrusion 40 has a slower decomposing rate than guard 30 of FIGS. 2 and 4. Consequently, metamorphic protrusion 40 resists moisture and root penetration longer than does guard 30 and so it remains intact longer in situ.

Notice that metamorphic protrusion 40 of FIG. 5 can be used with a conventional container having side wall drain apertures such as those shown in FIG. 4.

FIG. 6—Stacked Guards

FIG. 6 is a top perspective view in partial section of a pair of metamorphic damping-off guards placed in an excess water shedding root shaping plant container. In this embodiment, two metamorphic damping-off guards are used, one stacked on top of another.

Guard 30 is placed on top of second guard 60. Second guard 60, in turn, is placed on protrusion 120 of excess water shedding root shaping plant container 100. Guard 30 is preferably smaller in diameter than second guard 60 so that the frustum shape of protrusion 120 is continued smoothly upward from protrusion 120's base to guard apex 31.

Metamorphic guard 60 has a slower decomposing rate than guard 30. Consequently, guard 60 resists moisture and root penetration longer than does guard 30 and so resists root and moisture penetration longer.

In yet other alternate embodiments, Guards 30 and 60 could be placed on either insertable protrusion 20 shown in FIG. 4, or metamorphic protrusion 40 shown in FIG. 5.

Figure 7:
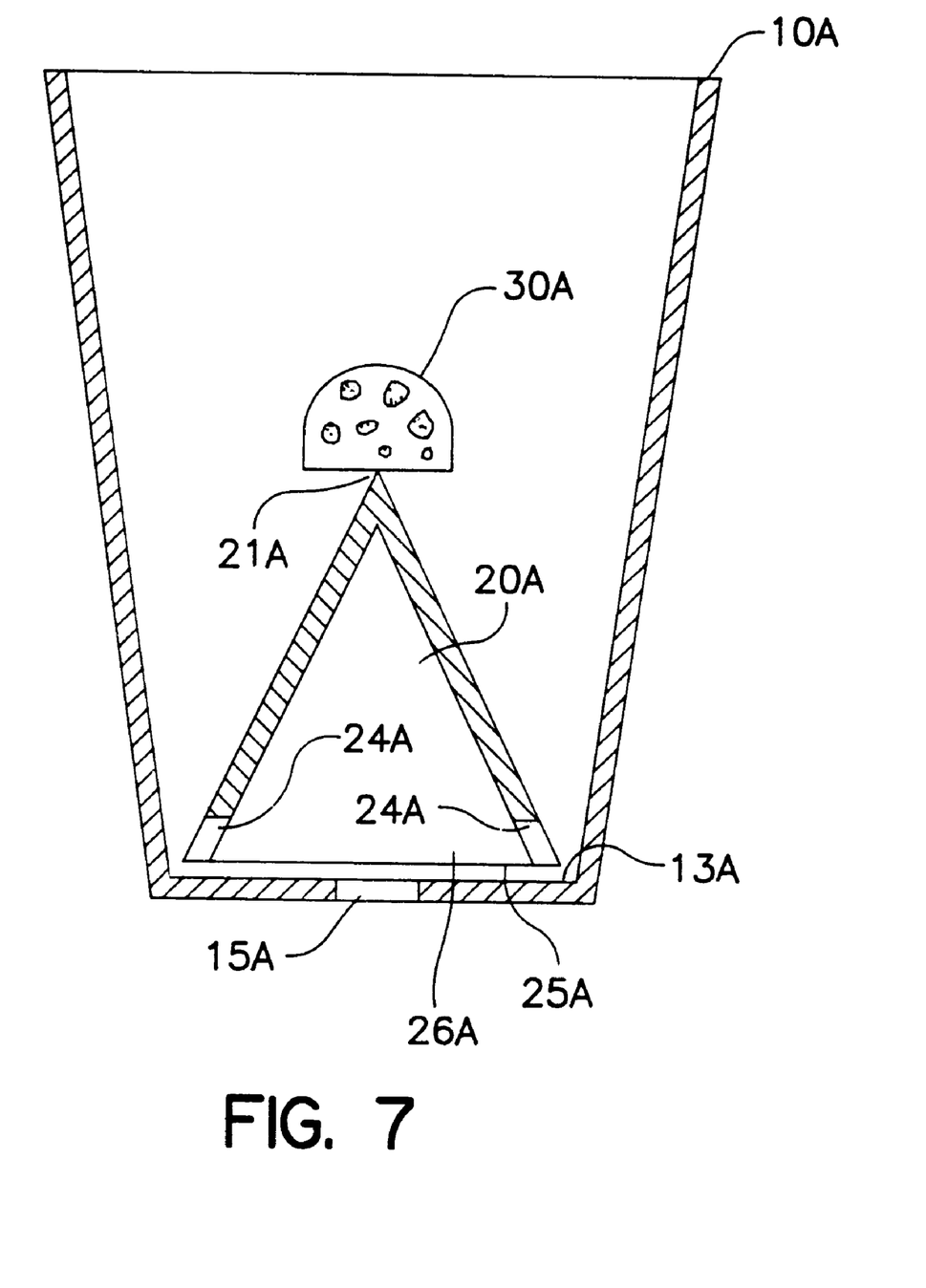

FIG. 7—Alternate Shapes

FIG. 7 shows quite different shapes for a guard and insertable protrusion compared with FIGS. 1 through 6. FIG. 7 is a vertical section view of a hemispheric shaped metamorphic damping-off guard placed above a conically shaped insertable protrusion.

Insertable protrusion 20A has a conical shape. Guard 30A has a hemispheric shape. Insertable protrusion 20A is placed on floor 13A of conventional container 10A. Guard 30A is placed above protrusion apex 21 A. Drain notch breakaways 24A have been removed, thereby providing drain notches which allow excess water to flow from container 10A's soil receiving space through protrusion hollow 26A and protrusion base opening 25A and out drain aperture 1 5A.

The main point to note from FIG. 7 is that this combination of elements is quite sturdy despite first appearances. Soil held in a container can easily support part or all of a guard. In practice, insertable protrusion 20A would first be placed on container floor 13A. Then, soil would be added to container 10A until level with protrusion apex 21A. Guard 30A would then be placed above protrusion apex 21 A resting on both it and the surrounding soil. Finally, a seedling would be planted above guard apex 31 A with its roots spread into additional soil placed around and above guard 30A.

It follows that any convenient shapes for either metamorphic damping-off guard 30A or insertable protrusion 20A that meet the conditions given above can be used as alternate embodiments for the present invention.

CONCLUSION, RAMIFICATIONS AND SCOPE OF INVENTION

Accordingly, the reader will see that the plant container accessory disclosed herein improves the performance of a plant container.

While my above description contains many specificities, these should not be construed as limitations on the scope of the invention, but rather as an exemplification of certain preferred embodiments thereof. Many other variations are possible. Accordingly, the scope of my invention should be determined not by the embodiments illustrated, but by the appended claims and their legal equivalents.

I claim:

1. A soil excluding device in combination with a plant container, said device being comprised of:
    (a) a plurality of objects, said objects being:
        (i) rigid,
        (ii) durable,
        (iii) of predetermined size,
        (iv) substantially harmless to plant roots,
        (v) substantially impervious to both moisture penetration and root penetration,
        (vi) collectively porous when packed together; and
    (b) a cement, said cement being:
        (i) substantially harmless to plant roots,
        (ii) substantially impervious to both moisture penetration and root penetration,
        (iii) consumed or decomposed by normal biological activity;
    (c) wherein:
        (i) said cement binds said objects into a unitary whole, and
        (ii) said cement substantially fills the space between said objects;

wherein:
    (a) said device substantially excludes both moisture and roots from its volume; and
    (b) said device is placed within the soil receiving space of said plant container;
whereby a seedling planted above said device is protected from damping-off while young but will be able to grow roots through said device when mature.

2. The device set forth in claim 1, wherein said objects are stones, and said cement is wax.

3. The device set forth in claim 1, wherein said device contains a plurality of additives.

4. The device set forth in claim 3, wherein one of said additives is a fungicide.

5. The device set forth in claim 3, wherein one of said additives is a nutrient.

6. The device set forth in claim 1, wherein said device has:
    (a) an apex;
    (b) a continuous side surface;
    (c) a base; and
    (d) wherein said side surface slopes upwardly and inwardly from said base to said apex.

7. The device set forth in claim 6, wherein said base of said device has a plurality of radial drain grooves.

8. The device set forth in claim 1, further including a protrusion, said protrusion having an apex, a continuous side wall, and a base; said protrusion being placed on the floor of said plant container; said device being placed on said apex of said protrusion; wherein said protrusion and said device together define a soil excluding space within the soil receiving space of said plant container.

9. The device set forth in claim 1, wherein said plant container is an excess water shedding root shaping plant container, and said device is placed on the apex of the protrusion of said excess water shedding root shaping plant container.

10. A soil excluding device in combination with a conventional plant container, said device being comprised of:
    (a) a protrusion, said protrusion having:
        (i) a hollow interior,
        (ii) a closed apex,
        (iii) a closed continuous side wall,
        (iv) an open base,
        (v) a plurality of drain notch breakaways; and
    (b) wherein:
        (i) said protrusion side wall slopes upwardly and inwardly from said base to said apex,
        (ii) said open base leads into said hollow interior,
        (iii) each one of said breakaways is formed in said protrusion side wall adjacent said base thereby creating a respective one drain notch in said side wall when removed; and
        (iv) said protrusion is placed on the floor of said container within the soil receiving space of said container;
whereby soil surrounding said protrusion within said container is caused to shed excess moisture.

11. The device set forth in claim 10, further including said protrusion side wall having a plurality of circumferential rim breakaways.

12. A soil excluding assembly in combination with a conventional plant container, said assembly being comprised of:
    (a) a guard, said guard having:
        (i) a plurality of rigid, durable, nonabsorbent, substantially harmless objects of predetermined size wherein said plurality is porous when said objects are packed together, (ii) a biodegradable, nonabsorbent, substantially harmless cement, (iii) wherein said objects are bonded together by said cement; and (b) a protrusion, said protrusion having:
  (i) an apex,
  (ii) a continuous side surface,
  (iii) a base;

wherein:
  (i) said protrusion is placed on the floor of said container within the soil receiving space of said container,
  (ii) said guard is placed on said apex of said protrusion; whereby a plant planted above said assembly will be protected from damping-off when a seedling and excess moisture injury when mature.

13. The assembly set forth in claim 12, wherein said protrusion is comprised of:

(a) a plurality of rigid, durable, nonabsorbent, substantially harmless objects of predetermined size wherein said plurality is porous when said objects are packed together; and (b) a biodegradable, nonabsorbent, substantially harmless cement; and (c) wherein said objects are bonded together by said cement.

14. The assembly set forth in claim 13, wherein said protrusion biodegrades more slowly than said guard.

15. The assembly set forth in claim 12, further including (a) said protrusion side surface sloping upwardly and inwardly from the perimeter of said protrusion base to the perimeter of said protrusion apex;

(b) said guard having an apex, a continuous side surface, and a base, said guard side surface sloping upwardly and inwardly from the perimeter of said guard base to the perimeter of said guard apex; and (c) the periphery of said guard base being geometrically similar to the periphery of said protrusion apex.

16. The assembly set forth in claim 12, wherein said cement substantially fills the space between said objects.

17. The assembly set forth in claim 12, further including said guard containing a plurality of additives.

* * * * *